(12) United States Patent
Nimura (10) Patent No.: US 10,852,463 B2
(45) Date of Patent: Dec. 1, 2020

(54) REFLECTION FILM, TRANSPARENT SCREEN, COLOR FILTER, AND DECORATIVE FILM

(71) Applicant: FUJIFILM Corporation, Tokyo (JP)

(72) Inventor: Shigeaki Nimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/746,948

(22) Filed: Jan. 19, 2020

(65) Prior Publication Data

US 2020/0150328 A1 May 14, 2020

Related U.S. Application Data

(63) Continuation of application No. PCT/JP2018/030045, filed on Aug. 10, 2018.

(30) Foreign Application Priority Data

Aug. 15, 2017 (JP) .................................. 2017-156860

(51) Int. Cl.
*G02F 1/1335* (2006.01)
*G02B 5/26* (2006.01)

(52) U.S. Cl.
CPC .......... *G02B 5/26* (2013.01); *G02F 1/133553* (2013.01); *G02F 2201/343* (2013.01)

(58) Field of Classification Search
CPC ...... G02B 5/3016; G02B 5/3083; G02B 5/26; G02B 27/0172; G02B 6/0026;
(Continued)

(56) References Cited

U.S. PATENT DOCUMENTS

2003/0058387 A1 3/2003 Fuenfschilling et al.
2012/0086904 A1 4/2012 Oki et al.
(Continued)

FOREIGN PATENT DOCUMENTS

JP 2003521742 7/2003
JP 2010286643 12/2010
(Continued)

OTHER PUBLICATIONS

"International Search Report (Form PCT/ISA/210)" of PCT/JP2018/030045, dated Oct. 16, 2018, with English translation thereof, pp. 1-4.
(Continued)

*Primary Examiner* — Thoi V Duong
(74) *Attorney, Agent, or Firm* — JCIPRNET (57) ABSTRACT

The invention provides a reflection film in which generation of side lobes derived from a cholesteric liquid crystalline layer is suppressed. A reflection film of the invention includes: a first cholesteric liquid crystalline layer which is formed of a composition including a first liquid crystal compound; and a second cholesteric liquid crystalline layer which is disposed at least on one surface of the first cholesteric liquid crystalline layer and formed of a composition including a second liquid crystal compound, in which a helical pitch length of the first cholesteric liquid crystalline layer is constant, a birefringence $\Delta n_2$ of the second liquid crystal compound is smaller than a birefringence $\Delta n_1$ of the first liquid crystal compound, and a helical pitch number of the second cholesteric liquid crystalline layer is a half or less of a helical pitch number of the first cholesteric liquid crystalline layer.

20 Claims, 2 Drawing Sheets

(58) Field of Classification Search
CPC . G02B 6/0055; G02F 1/13718; G02F 1/1393; G02F 1/13363; G02F 1/133553; G02F 2201/343; G02F 2001/133521; G02F 2203/02; G02F 2413/13; G02F 2413/14; B32B 2307/416; B32B 7/02; B32B 2457/202

See application file for complete search history.

(56) References Cited

U.S. PATENT DOCUMENTS

2012/0094118 A1* 4/2012 Oki ................. G02B 5/0841
428/354
2017/0343807 A1 11/2017 Anzai et al.

FOREIGN PATENT DOCUMENTS

| JP | 2012203123 | 10/2012 |
| WO | 2016133186 | 8/2016 |

OTHER PUBLICATIONS

"Written Opinion of the International Searching Authority (Form PCT/ISA/237)" of PCT/JP2018/030045, dated Oct. 16, 2018, with English translation thereof, pp. 1-9.

* cited by examiner

REFLECTION FILM, TRANSPARENT SCREEN, COLOR FILTER, AND DECORATIVE FILM

CROSS-REFERENCE TO RELATED APPLICATIONS

This application is a Continuation of PCT International Application No. PCT/JP2018/030045 filed on Aug. 10, 2018, which claims priority under 35 U.S.C. § 119(a) to Japanese Patent Application No. 2017-156860 filed on Aug. 15, 2017. The above application is hereby expressly incorporated by reference, in its entirety, into the present application.

BACKGROUND OF THE INVENTION

1. Field of the Invention

The present invention relates to a reflection film, a transparent screen, a color filter, and a decorative film.

2. Description of the Related Art

A layer obtained by fixing a cholesteric liquid crystalline phase (hereinafter, also referred to as a "cholesteric liquid crystalline layer") is known as a layer having properties of selectively reflecting any one of right circularly polarized light or left circularly polarized light in a specific wavelength range, and is developed for various purposes.

For example, JP2010-286643A discloses an infrared light reflection plate including a cholesteric liquid crystalline layer.

SUMMARY OF THE INVENTION

Figure 1:
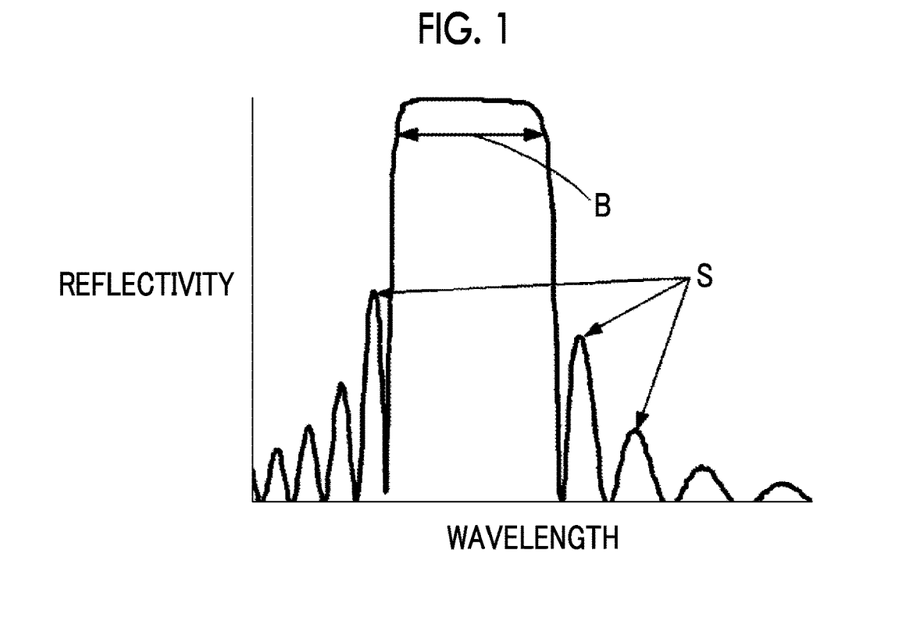
FIG. 1 is a graph showing typical reflectivity properties of a cholesteric liquid crystalline layer.

Meanwhile, in recent years, a demand for reflection properties of a cholesteric liquid crystalline layer is increasing, and suppression of generation of side lobes is particularly required. As shown in FIG. 1, the side lobes mean portions S in which a reflectivity at a wavelength in the vicinity of the outer side of a selective reflection range B is comparatively great. In a case where such side lobes are generated, it is not preferable, from a viewpoint of selective reflectivity, because light at a wavelength that is not supposed to be reflected is reflected.

The invention is made in view of such circumstances, and an object of the invention is to provide a reflection film in which generation of side lobes derived from a cholesteric liquid crystalline layer is suppressed.

Another object of the invention is to provide a transparent screen, a color filter, and a decorative film including the reflection film described above.

As a result of intensive studies regarding the aforementioned intensive studies, the inventors have found that the objects can be achieved by laminating a cholesteric liquid crystalline layer satisfying predetermined properties.

That is, the inventors have found that the objects can be achieved with the following configurations.

(1) A reflection film, comprising:
a first cholesteric liquid crystalline layer which is formed of a composition including a first liquid crystal compound; and
a second cholesteric liquid crystalline layer which is disposed at least on one surface of the first cholesteric liquid crystalline layer and formed of a composition including a second liquid crystal compound,
in which an interval of helical pitches of the first cholesteric liquid crystalline layer is constant,
a birefringence $\Delta n_2$ of the second liquid crystal compound is smaller than a birefringence $\Delta n_1$ of the first liquid crystal compound, and
a helical pitch number of the second cholesteric liquid crystalline layer is a half or less of a helical pitch number of the first cholesteric liquid crystalline layer.

(2) The reflection film according to (1), in which the second cholesteric liquid crystalline layer is disposed on both surfaces of the first cholesteric liquid crystalline layer.

(3) The reflection film according to (1) or (2), in which two or more second cholesteric liquid crystalline layers are disposed at least on one surface of the first cholesteric liquid crystalline layer.

(4) The reflection film according to (3), in which each birefringence of the two or more second cholesteric liquid crystalline layers decreases along a direction separated from the first cholesteric liquid crystalline layer.

(5) The reflection film according to any one of (1) to (4), in which the helical pitch number of the second cholesteric liquid crystalline layer is ¼ or less of the helical pitch number of the first cholesteric liquid crystalline layer.

(6) The reflection film according to any one of (1) to (5), in which a percentage of the birefringence $\Delta n_2$ of the second liquid crystal compound with respect to the birefringence $\Delta n_1$ of the first liquid crystal compound is 10% to 90%.

(7) The reflection film according to any one of (1) to (6), in which both of a reflection center wavelength of the first cholesteric liquid crystalline layer and a reflection center wavelength of the second cholesteric liquid crystalline layer are positioned in a visible light region.

(8) The reflection film according to any one of (1) to (7), in which an absolute value of a difference between a reflection center wavelength of the first cholesteric liquid crystalline layer and a reflection center wavelength of the second cholesteric liquid crystalline layer is equal to or less than 50 nm.

(9) The reflection film according to any one of (1) to (8), in which the helical pitch number of the first cholesteric liquid crystalline layer is equal to or more than 10.

(10) The reflection film according to any one of (1) to (9), in which the first liquid crystal compound and the second liquid crystal compound are rod-like liquid crystal compounds. (11) A transparent screen, comprising: the reflection film according to any one of (1) to (10).

(12) A color filter, comprising: the reflection film according to any one of (1) to (10).

(13) A decorative film, comprising: the reflection film according to any one of (1) to (10).

According to the invention, it is possible to provide a reflection film in which generation of side lobes derived from a cholesteric liquid crystalline layer is suppressed.

According to the invention, it is also possible to provide a transparent screen, a color filter, and a decorative film including the reflection film described above.

DESCRIPTION OF THE PREFERRED EMBODIMENTS

Hereinafter, the invention will be described in detail. In the specification, a range of numerical values shown using "to" means a range including numerical values before and after "to" as a lower limit value and an upper limit value.

In the specification, "(meth)acrylate" is a term representing both acrylate and methacrylate, a "(meth)acryloyl group" is a term representing both an acryloyl group and a methacryloyl group, and "(meth)acryl" is a term representing both acryl and methacryl.

In the invention, visible light is light at a wavelength which is visually recognizable by a person among electromagnetic waves and is light in a wavelength range of 380 to 780 nm. Ultraviolet light is light in a wavelength range of 10 nm or more and less than 380 nm, and infrared light is light in a wavelength range exceeding 780 nm. In the visible light, light in a wavelength range of 420 to 490 nm is blue (B) light, light in a wavelength range of 495 to 570 nm is green (G) light, and light in a wavelength range of 620 to 750 nm is red (R) light.

In a reflection film of the invention, two kinds of cholesteric liquid crystalline layers satisfying a predetermined relationship are laminated on each other. A reason for obtaining desired effects by the configuration described above is because that, side lobes generated by the respectively cholesteric liquid crystalline layers interfere each other and both are weakened, by laminating two kinds of predetermined cholesteric liquid crystalline layers on each other, and accordingly, the side lobes are reduced. Hereinafter, the reflection film of the invention will be described in detail with reference to the drawings.

First Embodiment

Figure 2:
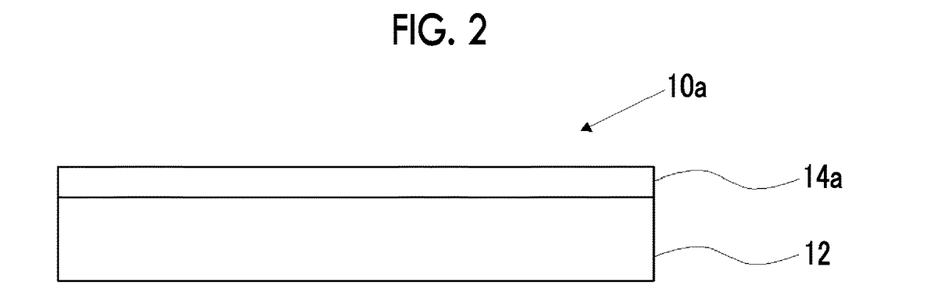
FIG. 2 is a cross-sectional view of a first embodiment of a reflection film.

FIG. 2 is a cross-sectional view of a first embodiment of a reflection film of the invention.

In FIG. 2, a reflection film 10a includes a first cholesteric liquid crystalline layer 12, and a second cholesteric liquid crystalline layer 14a disposed on one surface (on one of two main surfaces) of the first cholesteric liquid crystalline layer 12.

Hereinafter, a member configuring the reflection film 10a will be described in detail.

<First Cholesteric Liquid Crystalline Layer>

The first cholesteric liquid crystalline layer is a layer formed of a composition including a first liquid crystal compound.

In the specification, the cholesteric liquid crystalline layer is a layer formed by fixing a cholesteric liquid crystalline phase. That is, the first cholesteric liquid crystalline layer is a layer in which alignment of the first liquid crystal compound becoming the cholesteric liquid crystalline phase is maintained. The cholesteric liquid crystalline phase has circular polarization selective reflectivity of selectively reflecting any one of right circularly polarized light or left circularly polarized light. Accordingly, the first cholesteric liquid crystalline layer also has the circular polarization selective reflectivity.

Here, a "fixed" state of the cholesteric liquid crystalline phase is a state in which the alignment of the liquid crystal compound becoming the cholesteric liquid crystalline phase is maintained. More specifically, the "fixed" state of the cholesteric liquid crystalline phase is preferably a state in which the fixed alignment state is stably continuously maintained without providing fluidity in a layer and without changing the alignment state due to an external field or an external force, normally in a temperature range of 0° C. to 50° C., and −30° C. to 70° C. under severer condition.

In the first cholesteric liquid crystalline layer, it is enough, as long as optical properties of the cholesteric liquid crystalline phase are maintained in the layer, and the liquid crystal compound in the layer may not have liquid crystal properties. For example, a polymerizable liquid crystal compound may lose liquid crystal properties due to an increase in molecular weight due to a curing reaction.

As described above, the first cholesteric liquid crystalline layer is a layer formed of a composition including the first liquid crystal compound, and is preferably a layer cured by light irradiation, in a state where a polymerizable liquid crystal compound (liquid crystal compound including a polymerizable group) is set in an alignment state of a cholesteric liquid crystalline phase, by using a composition including the polymerizable liquid crystal compound.

The first cholesteric liquid crystalline layer shows circular polarization selective reflectivity caused by a helical structure derived from the cholesteric liquid crystalline phase. In general, a reflection center wavelength $\lambda$ of selective reflection of the cholesteric liquid crystalline layer (selective reflection center wavelength $\lambda$) depends on a pitch length P (=period of helix: helical pitch length) of a helical structure, and is in a relationship of an average refractive index n of the cholesteric liquid crystalline layer and $\lambda = n \times P$. Therefore, the wavelength showing circular polarization selective reflectivity can be adjusted by adjusting this helical pitch length P.

The reflection center wavelength of the first cholesteric liquid crystalline layer can be suitably adjusted, may be positioned in any region of a visible light region, an ultraviolet light region, and an infrared light region, and is preferably positioned in the visible light region for development for various purposes. In a case where the reflection center wavelength of the first cholesteric liquid crystalline layer is positioned in the visible light region, the reflection center wavelength may be positioned in any region of a blue light region, a green light region, and a red light region.

The helical pitch length of the cholesteric liquid crystalline phase depends on the kind of a chiral agent used with the liquid crystal compound or an added concentration thereof, and thus, a desired helical pitch length can be obtained by adjusting these.

In a case where a minimum value of transmittance in a reflection spectrum of the cholesteric liquid crystalline layer is set as Tmin (%), in a case of obtaining the reflection center wavelength X from the reflection spectrum of the cholesteric liquid crystalline layer, an average value of two wavelengths showing half transmittance: T½ (%) shown with the following equation is set as the reflection center wavelength $\lambda$.

Equation for obtaining half transmittance: $T\frac{1}{2} = 100 - (100 - Tmin)/2$ The helical pitch length of the first cholesteric liquid crystalline layer is constant. More specifically, the pitch length P of the helical structure is constant in a thickness direction of the first cholesteric liquid crystalline layer. Here, the expression "the helical pitch length is constant" means that each helical pitch length of the first cholesteric liquid crystalline layer in the thickness direction is substantially the same. The expression "substantially the same" means that an absolute value of a difference between helical pitches is equal to or less than 30 nm.

The pitch length of the helical structure of the first cholesteric liquid crystalline layer is not particularly limited, and is preferably 230 to 550 nm and more preferably 250 to 450 nm, in a case of adjusting the reflection center wavelength λ to be positioned in the visible light region.

As a measuring method of the pitch length of the helical structure, methods disclosed in "Introduction: Liquid Crystal Experiments" (edited by the Japanese Liquid Crystal Society, Sigma Publications, published in 2007 p. 46) and "Liquid Crystal Handbook" (Liquid Crystal Handbook Editorial Committee, Maruzen Publishing, p. 196) can be used.

The helical pitch number of the first cholesteric liquid crystalline layer is not particularly limited and is preferably equal to or more than 10.0 and more preferably equal to or more than 12.0, from a viewpoint of reflection properties. An upper limit is not particularly limited and may be equal to or less than 20.0.

In the specification, the helical pitch number means a pitch number (winding number) of a helical structure derived from a cholesteric liquid crystalline phase in a cholesteric liquid crystalline layer.

As a measurement method, the helical pitch number is calculated by a film thickness/helical pitch length of the cholesteric liquid crystalline layer.

As described above, the first cholesteric liquid crystalline layer is formed of the composition including the first liquid crystal compound. Hereinafter, the components included in the composition will be described in detail, and a manufacturing method of the first cholesteric liquid crystalline layer will be described in detail.

(First Liquid Crystal Compound)

The first liquid crystal compound can be classified into a rod-like type (rod-like liquid crystal compound) and a disk-like type (discotic liquid crystal compound, disk-like liquid crystal compound) from the shape thereof, and a rod-like liquid crystal compound is preferable, from a viewpoint of adjusting the helical pitch number. The rod-like type and the disk-like type respectively include a low-molecular-weight type and a high-molecular-weight type. The high molecular weight indicates a polymerization degree equal to or greater than 100 (Polymer Physics • Phase Transition Dynamics, Masao Doi, p. 2, Iwanami Shoten, 1992). In the invention, any liquid crystal compound can be used. In addition, two or more kinds of liquid crystal compounds may be used in combination.

A birefringence $\Delta n_1$ (refractivity anisotropy $\Delta n_1$) of the first liquid crystal compound is not particularly limited, as long as a predetermined relationship is satisfied with a birefringence $\Delta n_2$ (refractivity anisotropy $\Delta n_2$) of a second liquid crystal compound which will be described later.

The birefringence $\Delta n_1$ of the first liquid crystal compound is 0.10 to 0.50, in many cases.

In the specification, as a measurement method of the $\Delta n$ ($\Delta n_1$ and $\Delta n_2$ which will be described later), a method using a wedge-shaped liquid crystal cell disclosed in p. 202 of Liquid Crystal Handbook (Liquid Crystal Handbook Editorial Committee, Maruzen Publishing) is generally used.

The $\Delta n$ ($\Delta n_1$ and $\Delta n_2$ which will be described later) corresponds to a measurement value at a wavelength of 550 nm at 30° C.

The first liquid crystal compound may be a polymerizable group. The kind of the polymerizable group is not particularly limited, a functional group capable of an addition polymerization reaction is preferable, and an ethylenically unsaturated polymerizable group or a cyclic polymerizable group is preferable. More specifically, as the polymerizable group, a (meth)acryloyl group, a vinyl group, a styryl group, an allyl group, an epoxy group, and an oxetane group are preferable, and a (meth)acryloyl group is more preferable.

Examples of the first liquid crystal compound include polymerizable rod-like liquid crystal compounds, and more specific examples thereof include compounds disclosed in Makromol. Chem., vol. 190, 2255 p, (1989), Advanced Materials, vol. 5, 107 p (1993), U.S. Pat. Nos. 4,683,327A, 5,622,648A, 5,770,107A, WO95/022586A, WO95/024455A, WO97/000600A, WO98/023580A, WO98/052905A, WO2008/133290A, JP1989-272551A (JP-H01-272551A), JP 1994-016616A (JP-H06-016616A), JP1995-110469A (JP-H07-110469A), JP1999-080081A (JP-H11-080081), JP2001-064627, JP2010-074759, JP2010-141468, JP2008-019240A, JP2013-166879A, JP2014-198814A, and JP2014-198815A.

The first liquid crystal compound may be used alone or in combination of two or more kinds thereof.

A content of the first liquid crystal compound in the composition is not particularly limited, and is preferably equal to or more than 80% by mass and more preferably equal to or more than 90% by mass with respect to a total solid content in the composition. An upper limit value is not particularly limited and may be equal to or less than 99% by mass.

(Chiral Agent)

The composition may include a chiral agent.

The kind of the chiral agent is not particularly limited. The chiral agent may be liquid crystalline or amorphous. The chiral agent can be selected from various well-known compounds (for example, Liquid Crystal Device Handbook, third chapter paragraphs 4-3, a chiral agent for TN (twisted nematic) or STN (super-twisted nematic), p. 199, Japan Society for the Promotion of Science 142th Committee Edition, 1989). The chiral agent generally includes asymmetric carbon atoms. However, an axial asymmetric compound or a planar asymmetric compound not including asymmetric carbon atoms can also be used as the chiral agent. As an example of an axial asymmetric compound or a planar asymmetric compound, binaphthyl, helicene, paracyclophane, and derivatives thereof are included. The chiral agent may include a polymerizable group.

The chiral agent may be used alone or in combination of two or more kinds thereof. A content of the chiral agent in the composition is not particularly limited, and is preferably 0.5 to 30% by mass with respect to a total mass of the first liquid crystal compound.

(Polymerization Initiator)

The composition may include a polymerization initiator. Particularly, in a case where the liquid crystal compound includes a polymerizable group, the composition preferably includes a polymerization initiator.

As the polymerization initiator, a photopolymerization initiator which can start the polymerization reaction by an ultraviolet light irradiation is preferable. A content of the polymerization initiator in the composition is not particularly limited, and is preferably 0.1 to 20% by mass and more preferably 1 to 8% by mass with respect to a total mass of the first liquid crystal compound.

(Alignment Controlling Agent (Alignment Agent))

The composition may include an alignment controlling agent. In a case where the composition includes the alignment controlling agent, stable and rapid formation of the cholesteric liquid crystalline phase can be performed.

A content of the alignment controlling agent in the composition is not particularly limited, and is preferably 0.01 to 10% by mass and more preferably 0.01 to 5% by mass with respect to a total mass of the first liquid crystal compound.

(Solvent)

The composition may include a solvent.

As the solvent, water or an organic solvent is used. Examples of the organic solvent include amides such as N,N-dimethylformamide; sulfoxides such as dimethyl sulfoxide; a heterocyclic compound such as pyridine; hydrocarbon such as benzene or hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate.

(Other Additives)

The composition may include other additives such as an antioxidant, an ultraviolet light absorbing agent, a sensitizer, a stabilizer, a plasticizer, a chain transfer agent, a polymerization inhibitor, an anti-foaming agent, a leveling agent, a thickener, a flame retardant, a surfactant substance, a dispersing agent, and a coloring material such as a dye or a pigment.

(Manufacturing Method)

A manufacturing method of the first cholesteric liquid crystalline layer is not particularly limited, and a method of applying the composition on a support to form a coating, performing a heating treatment with respect to the coating for cholesteric alignment of the first liquid crystal compound, and fixing the formed cholesteric liquid crystalline layer to form the first cholesteric liquid crystalline layer is preferable, from a viewpoint of easily adjusting the helical pitch number of the first cholesteric liquid crystalline layer.

Hereinafter, the procedure of the method described above will be described in detail.

First, the kind of the support coated with the composition is not particularly limited. As the support, a temporary support peeled off after the formation of the cholesteric liquid crystalline layer may be used.

In a case where the support is a temporary support, there is no limitation regarding optical properties such as transparency and refractivity, because the support is not a layer configuring a reflection film. As the support (temporary support), a glass substrate may be used, in addition to a plastic film.

An alignment film may be provided on the support, as necessary. A rubbing treatment may be performed on a surface of the support and the composition may be applied on the surface subjected to the rubbing treatment.

A method of applying the composition to the support is not particularly limited, and examples thereof include a wire bar coating method, a curtain coating method, an extrusion coating method, a direct gravure coating method, a reverse gravure coating method, a die-coating method, a spin coating method, a dip coating method, and a spray coating method.

Next, by heating the formed coating, the first liquid crystal compound is cholesteric-aligned. A heating temperature is preferably equal to or lower than 200° C. and more preferably equal to or lower than 130° C. By this alignment treatment, the first liquid crystal compound is twist-aligned so that the first liquid crystal compound has a helical axis in a direction substantially orthogonal to the surface of the support.

As a method of fixing the formed cholesteric liquid crystalline phase, a method of polymerizing the first liquid crystal compound is used, in a case where the first liquid crystal compound includes a polymerizable group. The polymerization is preferably any of thermal polymerization and photopolymerization.

The light irradiation during the photopolymerization is preferably performed using ultraviolet light. An irradiation energy is preferably 20 mJ/cm$^2$ to 50 J/cm$^2$ and more preferably 100 to 1500 mJ/cm$^2$. In order to proceed the photopolymerization reaction, the light irradiation may be performed under a heating condition or in a nitrogen atmosphere.

<Second Cholesteric Liquid Crystalline Layer>

A second cholesteric liquid crystalline layer is a layer formed of a composition including a second liquid crystal compound. The second cholesteric liquid crystalline layer is a layer formed by fixing a cholesteric liquid crystalline phase, in the same manner as in the first cholesteric liquid crystalline layer. That is, the second cholesteric liquid crystalline layer is a layer in which alignment of the second liquid crystal compound becoming the cholesteric liquid crystalline phase is maintained.

A helical pitch number of the second cholesteric liquid crystalline layer is half or less of the helical pitch number of the first cholesteric liquid crystalline layer. Among these, from a viewpoint of further suppressing generation of side lobes, the helical pitch number of the second cholesteric liquid crystalline layer is preferably 1/4 or less of the helical pitch number of the first cholesteric liquid crystalline layer.

In addition, from a viewpoint of further suppressing generation of side lobes, the helical pitch number of the second cholesteric liquid crystalline layer is preferably 1/10 or less of the helical pitch number of the first cholesteric liquid crystalline layer.

The helical pitch number of the second cholesteric liquid crystalline layer may satisfy a predetermined relationship with the helical pitch number of the first cholesteric liquid crystalline layer, and is preferably less than 10.0, more preferably equal to or less than 5.0, and even more preferably equal to or less than 3.0, from a viewpoint of further suppressing the generation of side lobes. A lower limit is particularly limited and may be equal to or more than 1.0.

A measurement method of the helical pitch number is a method described in the section of the first cholesteric liquid crystalline layer.

A pitch length of the helical structure of the second cholesteric liquid crystalline layer is not particularly limited, and is preferably 230 to 550 nm and more preferably 250 to 450 nm, in a case of adjusting the reflection center wavelength λ, to be positioned in the visible light region.

A measurement method of the pitch length of the helical structure is a method described in the section of the first cholesteric liquid crystalline layer.

The reflection center wavelength of the second cholesteric liquid crystalline layer can be suitably adjusted, may be positioned in any region of a visible light region, an ultraviolet light region, and an infrared light region, and is preferably positioned in the visible light region for development for various purposes. In a case where the reflection center wavelength of the second cholesteric liquid crystalline layer is positioned in the visible light region, the reflection center wavelength may be positioned in any region of a blue light region, a green light region, and a red light region.

An absolute value of a difference between the reflection center wavelength of the first cholesteric liquid crystalline layer and the reflection center wavelength of the second cholesteric liquid crystalline layer is not particularly limited, and is preferably equal to or less than 50 nm and more preferably equal to or less than 25 nm, from a viewpoint of further suppressing generation of side lobes. A lower limit is not particularly limited and is 0.

As described above, the second cholesteric liquid crystalline layer is formed of a composition including the second liquid crystal compound. As a preferred aspect of the components included in the composition other than the second liquid crystal compound and a preferred aspect of the manufacturing method of the second cholesteric liquid crystalline layer, the aspects described in the section of the first cholesteric liquid crystalline layer are used.

The second liquid crystal compound and the first liquid crystal compound are different in a point of the birefringence $\Delta n$. Specifically, the birefringence $\Delta n_2$ of the second liquid crystal compound is smaller than the birefringence $\Delta n_1$ of the first liquid crystal compound. Among these, form a viewpoint of further suppressing the generation of side lobes, a percentage (%) of the birefringence $\Delta n_2$ of the second liquid crystal compound to the birefringence $\Delta n_1$ of the first liquid crystal compound (($\Delta n_2/\Delta n_1$)×100) is preferably 10% to 90% and more preferably 20% to 80%.

The birefringence $\Delta n_2$ of the second liquid crystal compound is not particularly limited, as long as the relationship is satisfied, and is preferably equal to or less than 0.25 and more preferably equal to or less than 0.20, from a viewpoint of further suppressing the generation of side lobes. A lower limit is not particularly limited and may be equal to or more than 0.05.

The preferred aspect of the second liquid crystal compound is the same as that of the first liquid crystal compound, except that the birefringence is different from that of the first liquid crystal compound. Specifically, as the second liquid crystal compound, a rod-like liquid crystal compound and a disk-like liquid crystal compound are used, in the same manner as in the first liquid crystal compound, and the preferred examples thereof are as described in the section of the first liquid crystal compound.

In addition, the second liquid crystal compound is preferably a liquid crystal compound including a polymerizable group, in the same manner as in the first liquid crystal compound.

The reflection film may include a layer other than the first cholesteric liquid crystalline layer and the second cholesteric liquid crystalline layer. For example, the reflection film may include a support in a range not negatively affecting the effect of the invention.

In addition, the reflection film may include an antireflection layer on the outermost surface thereof. As the antireflection layer, a dielectric multilayer or the like in which a low refractive index layer and a high refractive index layer are alternately laminated on each other is used.

Second Embodiment

Figure 3:
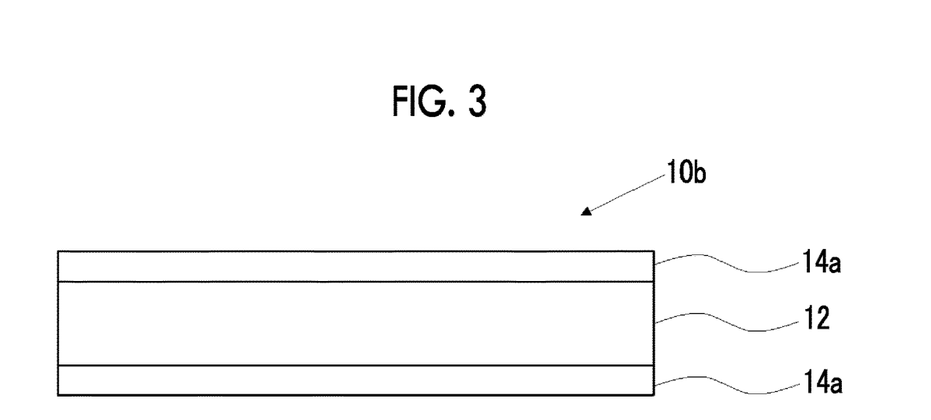
FIG. 3 is a cross-sectional view of a second embodiment of a reflection film.

FIG. 3 is a cross-sectional view of a second embodiment of the reflection film of the invention.

In FIG. 3, a reflection film 10b includes the first cholesteric liquid crystalline layer 12, and second cholesteric liquid crystalline layers 14a disposed on both surfaces (on two main surfaces) of the first cholesteric liquid crystalline layer 12.

The reflection film 10b has the same configuration as that of the reflection film 10a of the first embodiment, except that the second cholesteric liquid crystalline layers 14a are provided on both surfaces of the first cholesteric liquid crystalline layer 12. That is, the configurations of the first cholesteric liquid crystalline layer 12 and the second cholesteric liquid crystalline layers 14a are the same as in the first embodiment.

As in the reflection film 10b, by disposing the second cholesteric liquid crystalline layers 14a on both surfaces of the first cholesteric liquid crystalline layer 12, the generation of side lobes is further suppressed.

Third Embodiment

Figure 4:
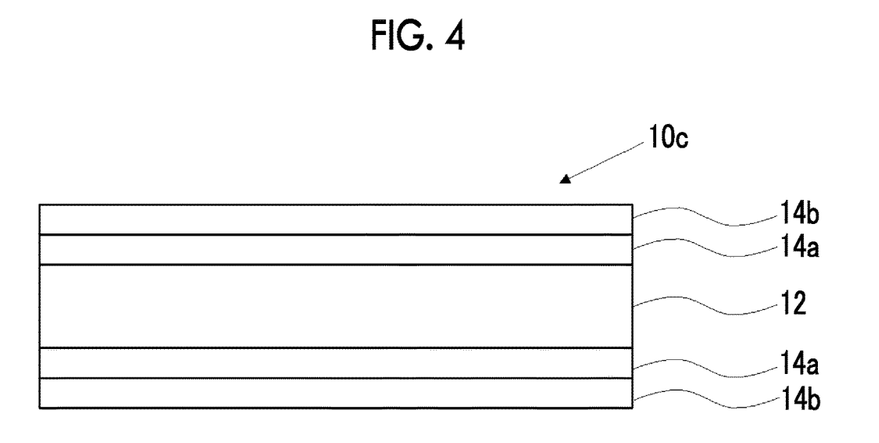
FIG. 4 is a cross-sectional view of a third embodiment of a reflection film.

FIG. 4 is a cross-sectional view of a third embodiment of the reflection film of the invention.

In FIG. 4, a reflection film 10c includes the first cholesteric liquid crystalline layer 12, a second cholesteric liquid crystalline layer 14a and a second cholesteric liquid crystalline layer 14b disposed on one surface of the first cholesteric liquid crystalline layer 12, and a second cholesteric liquid crystalline layer 14a and a second cholesteric liquid crystalline layer 14b disposed on the other surface of the first cholesteric liquid crystalline layer 12.

The reflection film 10c has the same configuration as that of the reflection film 10b of the second embodiment, except that two second cholesteric liquid crystalline layers are laminated.

In addition, both of the second cholesteric liquid crystalline layers 14a and 14b are layers formed of a composition including the second liquid crystal compound showing the birefringence $\Delta n_2$ smaller than the birefringence $\Delta n_1$ of the first liquid crystal compound, and are a layer having a helical pitch number which is half or less of the helical pitch number of the first cholesteric liquid crystalline layer 12.

The second cholesteric liquid crystalline layer 14a and the second cholesteric liquid crystalline layer 14b are different in a point of the birefringence $\Delta n_2$. Specifically, the birefringence $\Delta n_2$ of the second cholesteric liquid crystalline layer 14b is smaller than the birefringence $\Delta n_2$ of the second cholesteric liquid crystalline layer 14a. That is, in the reflection film 10c, the birefringence $\Delta n_2$ of each of the two second cholesteric liquid crystalline layers 14a and 14b decreases along a direction separated from the first cholesteric liquid crystalline layer 12. By providing the reflection film with the aspect described above, the generation of side lobes is further suppressed.

A relationship between a helical pitch number of a second liquid crystal compound X used in the formation of the second cholesteric liquid crystalline layer 14a and a helical pitch number of a second liquid crystal compound Y used in the formation of the second cholesteric liquid crystalline layer 14b is not particularly limited.

The preferred aspects of the helical pitch number, the pitch length of the helical structure, and the reflection center wavelength of the second cholesteric liquid crystalline layer 14b are the same as preferred aspects of the second cholesteric liquid crystalline layer 14a described in the first embodiment.

In FIG. 4, the aspect in which the two second cholesteric liquid crystalline layers are disposed on one surface of the first cholesteric liquid crystalline layer has been described, but there is no limitation to this aspect, and three or more second cholesteric liquid crystalline layers may be disposed on one surface of the first cholesteric liquid crystalline layer. In this case, it is preferable that the birefringence $\Delta n_2$ of each of the two or more second cholesteric liquid crystalline layers decreases along a direction separated from the first cholesteric liquid crystalline layer.

In addition, in FIG. 4, the aspect in which the two second cholesteric liquid crystalline layers are disposed on both surfaces of the first cholesteric liquid crystalline layer has been described, but there is no limitation to this aspect, and two or more second cholesteric liquid crystalline layers may be disposed on one surface of the first cholesteric liquid crystalline layer. In this case, it is preferable that the birefringence $\Delta n_2$ of each of the two or more second cholesteric liquid crystalline layers decreases along a direction separated from the first cholesteric liquid crystalline layer.

Usage

The reflection film (first embodiment to third embodiment) can be applied in various usages. For example, a transparent screen, a color filter, and a decorative film including the reflection film described above are suitable.

EXAMPLES

Hereinafter, the invention will be described more specifically with reference to examples and comparative examples. The material, the used amount, the rate, the processing details, and process procedures shown in the following examples can be suitably changed, as long as the gist of the invention is not departed. Therefore, the scope of the invention is not limitedly translated by the specific examples shown below.

<Producing of Cholesteric Liquid Crystalline Layer A>

Components shown below were mixed in a container warmed to 25° C. and a liquid crystal composition A was produced. A birefringence $\Delta n$ of the liquid crystal compound 1 was 0.15.

| Liquid crystal composition A | |
|---|---|
| Liquid crystal compound 1 | 1 g |
| Chiral agent 2 | 80 mg |
| Horizontal alignment agent 1 | 1 mg |
| Initiator: IRGACURE 907 (manufactured by BASF) | 40 mg |
| Initiator: IRGANOX 1010 | 10 mg |
| Methyl ethyl ketone | 1.6 g |

Liquid crystal compound 1

Chiral agent 2

Horizontal alignment agent 1

The liquid crystal composition A produced as described above was applied on a temporary support with a wire bar by using a polyethylene terephthalate (PET, COSMOSHINE A4100) film manufactured by TOYOBO Co., LTD. having a thickness of 100 μm as the temporary support at room temperature and a coating was formed. During the coating, a thickness of the coating was adjusted so that the helical pitch number in a cholesteric liquid crystalline layer to be formed becomes a value shown in Table 1.

Next, the temporary support on which the coating was laminated was left still on a hot plate at 100° C. for 1 minute and the heating treatment was performed.

Then, the coating after the heating treatment was irradiated with UV (ultraviolet light) for a certain period of time in a nitrogen atmosphere (oxygen concentration: equal to or less than 500 ppm) at room temperature to cure the coating, and cholesteric liquid crystalline layers A were produced. As the cholesteric liquid crystalline layer A, two kinds of layers having the helical pitch number of 2.0 and 14.0 were produced.

The cholesteric liquid crystalline layer A was a layer reflecting right circularly polarized light and a reflection center wavelength of the cholesteric liquid crystalline layer A was 540 nm.

<Producing of Cholesteric Liquid Crystalline Layer B>

A cholesteric liquid crystalline layer B was produced according to the same procedure in <Producing of Cholesteric Liquid Crystalline Layer A>, except that a compound (I-3) in JP2012-193147A was used instead of the liquid crystal compound 1, the used amount of the chiral agent 2 was adjusted so that a reflection center wavelength of a cholesteric liquid crystalline layer to be formed becomes 540 nm, and a thickness of a coating was adjusted so that a helical pitch number in a cholesteric liquid crystalline layer to be formed becomes a value shown in Table 1. As the cholesteric liquid crystalline layer B, two kinds of layers having the helical pitch number of 2.5 and 14.0 were produced.

The cholesteric liquid crystalline layer B was a layer reflecting right circularly polarized light and a reflection center wavelength of the cholesteric liquid crystalline layer B was 540 nm.

A birefringence Δn of the compound (I-3) was 0.30.

<Producing of Cholesteric Liquid Crystalline Layer C>

A cholesteric liquid crystalline layer C was produced according to the same procedure in <Producing of Cholesteric Liquid Crystalline Layer A>, except that a compound 52 in JP2016-053149A was used instead of the liquid crystal compound 1, the used amount of the chiral agent 2 was adjusted so that a reflection center wavelength of a cholesteric liquid crystalline layer to be formed becomes 540 nm, and a thickness of a coating was adjusted so that a helical pitch number in a cholesteric liquid crystalline layer to be formed becomes a value shown in Table 1. As the cholesteric liquid crystalline layer C, three kinds of layers having the helical pitch number of 2.5, 5.0, and 7.0 were produced.

The cholesteric liquid crystalline layer C was a layer reflecting right circularly polarized light and a reflection center wavelength of the cholesteric liquid crystalline layer C was 540 nm.

A birefringence Δn of the compound 52 was 0.07.

Compound 52

<Producing of Cholesteric Liquid Crystalline Layer D>

A cholesteric liquid crystalline layer D was produced according to the same procedure in <Producing of Cholesteric Liquid Crystalline Layer A>, except that a compound R-1 in JP2012-193147A was used instead of the liquid crystal compound 1, the used amount of the chiral agent 2 was adjusted so that a reflection center wavelength of a cholesteric liquid crystalline layer to be formed becomes 540 nm, and a thickness of a coating was adjusted so that a helical pitch number in a cholesteric liquid crystalline layer to be formed becomes a value shown in Table 1. As the cholesteric liquid crystalline layer D, one kind of layer having the helical pitch number of 2.0 was produced.

The cholesteric liquid crystalline layer D was a layer reflecting right circularly polarized light and a reflection center wavelength of the cholesteric liquid crystalline layer D was 540 nm.

(I-3)

A birefringence Δn of the compound R-1 was 0.23.

(R-1)

Example 1

The cholesteric liquid crystalline layer A having the helical pitch number of 2.0 was produced according to the procedure in <Producing of Cholesteric Liquid Crystalline Layer A>.

The liquid crystal composition was applied and cured on the produced cholesteric liquid crystalline layer A according to the procedure in <Producing of Cholesteric Liquid Crystalline Layer D>, and the cholesteric liquid crystalline layer D having the helical pitch number of 2.0 was produced.

The liquid crystal composition was applied and cured on the produced cholesteric liquid crystalline layer D according to the procedure in <Producing of Cholesteric Liquid Crystalline Layer B>, and the cholesteric liquid crystalline layer B having the helical pitch number of 14.0 was produced.

The liquid crystal composition was applied and cured on the produced cholesteric liquid crystalline layer B according to the procedure in <Producing of Cholesteric Liquid Crystalline Layer D>, and the cholesteric liquid crystalline layer D having the helical pitch number of 2.0 was produced.

The liquid crystal composition was applied and cured on the produced cholesteric liquid crystalline layer D according to the procedure in <Producing of Cholesteric Liquid Crystalline Layer A>, and the cholesteric liquid crystalline layer A having the helical pitch number of 2.0 was produced.

The temporary support was peeled off from the obtained laminate, and a reflection film was produced.

Examples 2 to 6 and Comparative Examples 1 to 3

The procedures in <Producing of Cholesteric Liquid Crystalline Layer A> to <Producing of Cholesteric Liquid Crystalline Layer D> were suitably performed by considering the producing procedure of <Example 1>, so as to obtain the reflection film having the laminated structure shown in Table 1, and each reflection film of the examples and the comparative examples was produced.

<Evaluation of Side Lobe Generation>

The measurement of a reflectivity of each reflection film of the examples and the comparative examples was performed using a spectrophotometer (V-670 manufactured by JASCO Corporation). The measurement was performed in a state where the reflection film was immersed in liquid paraffin, in order to remove external disturbance due to the reflection on the surface thereof.

Next, a wavelength of an end portion E1 on a short wavelength side and a wavelength of an end portion E2 on a long wavelength side of a selective reflection range were determined based on the obtained reflection spectrum data.

Figure 5:
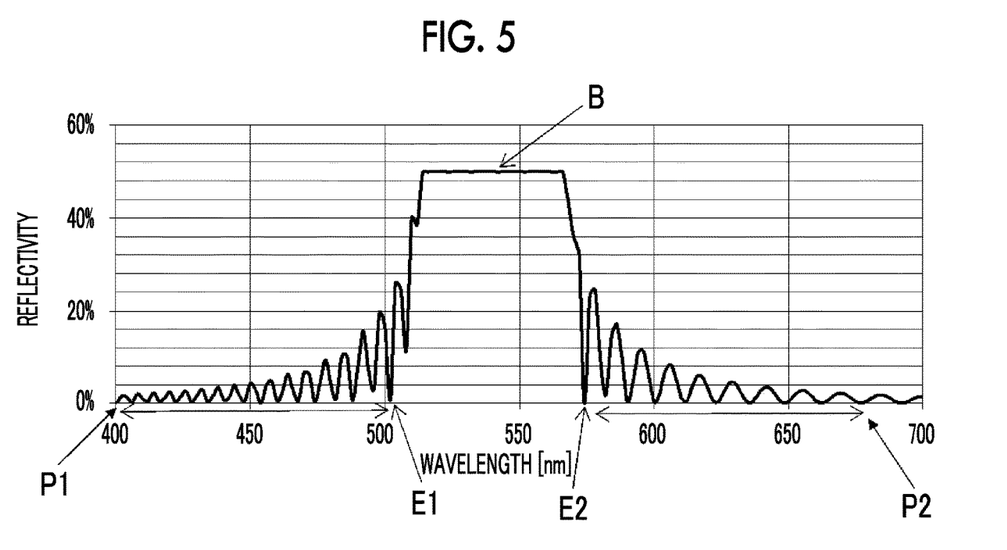
FIG. 5 is a view showing an example of data of reflection spectra.

The end portion E1 on the short wavelength side of the selective reflection range means a wavelength showing the minimum reflectivity of a valley where the reflectivity initially becomes 5% or less from the selective reflection range towards the short wavelength side. The end portion E2 on the long wavelength side of the selective reflection range means a wavelength showing the minimum reflectivity of a valley where the reflectivity initially becomes 5% or less from the selective reflection range towards the long wavelength side. An example of the reflection spectrum data is shown in FIG. 5. In FIG. 5, the end portion E1 on the short wavelength side of the selective reflection range B is positioned in the vicinity of approximately 500 nm, and the end portion E2 on the long wavelength side is positioned in the vicinity of approximately 575 nm.

Next, a wavelength of a position P1 obtained by subtracting 100 nm from a wavelength of the end portion E1 was calculated, and an integrated value V1 of a reflectivity between the wavelength of the end portion E1 and the wavelength of the position P1 was calculated. In addition, a wavelength of a position P2 obtained by adding 100 nm to a wavelength of the end portion E2 was calculated, and an integrated value V2 of a reflectivity between the wavelength of the end portion E2 and the wavelength of the position P2 was calculated. In FIG. 5, the position P1 is positioned in the vicinity of approximately 400 nm and the position P2 is positioned in the vicinity of approximately 675 nm.

Next, the obtained integrated values V1 and V2 were added, and a reflectivity of a side lobe in each of the examples and the comparative examples was calculated.

Then, by comparing the reflectivity of Examples 1 to 3 with the reflectivity of Comparative Example 1, a relative value of the reflectivity of the side lobe in each example, in a case where the reflectivity of the side lobe of Comparative Example 1 was 100%, was calculated and evaluation was performed based on the following standard.

In addition, by comparing the reflectivity of Examples 4 to 6 with the reflectivity of Comparative Examples 2 and 3, a relative value of the reflectivity of the side lobe in each example and comparative example, in a case where the reflectivity of the side lobe of Comparative Example 2 was 100%, was calculated and evaluation was performed based on the following standard.

"AA": less than 40%
"A": 40% or more and less than 60%
"B": 60% or more and less than 100%
"C": 100% or more and less than 150%
"D": 150% or more In Table 1, a first CL layer means the first cholesteric liquid crystalline layer. A second CL layer 1 to a second CL layer 4 mean the second cholesteric liquid crystalline layers.

In each reflection film of the examples and the comparative examples, the second CL layer 1 to the second CL layer 4 in Table 1 were laminated in this order. For example, in Example 1, the second CL layer 1, the second CL layer 2, the first CL layer, the second CL layer 3, and the second CL layer 4 are laminated in this order, and in Example 2, the second CL layer 1, the first CL layer, and the second CL layer 4 are laminated in this order.

In Table 1, Δn represents the birefringence Δn of the liquid crystal compound used in the formation of each cholesteric liquid crystalline layer.

In Table 1, the pitch number represents the helical pitch number in each cholesteric liquid crystalline layer.

TABLE 1

| | | | Example | | | | | | Comparative Example | | |
|---|---|---|---|---|---|---|---|---|---|---|---|
| | Table 1 | | 1 | 2 | 3 | 4 | 5 | 6 | 1 | 2 | 3 |
| Structure | Second CL layer 1 | Δn | 0.15 | 0.15 | 0.15 | 0.07 | 0.07 | 0.07 | — | — | 0.3 |
| | | Pitch number | 2.0 | 2.0 | 2.0 | 2.5 | 5.0 | 7.0 | — | — | 2.5 |
| | Second CL layer 2 | Δn | 0.23 | — | — | — | — | — | — | — | — |
| | | Pitch number | 2.0 | — | — | — | — | — | — | — | — |
| | First CL layer | Δn | 0.3 | 0.3 | 0.3 | 0.15 | 0.15 | 0.15 | 0.3 | 0.15 | 0.15 |
| | | Pitch number | 14.0 | 14.0 | 14.0 | 14.0 | 14.0 | 14.0 | 14.0 | 14.0 | 14.0 |
| | Second CL layer 3 | Δn | 0.23 | — | — | — | — | — | — | — | — |
| | | Pitch number | 2.0 | — | — | — | — | — | — | — | — |
| | Second CL layer 4 | Δn | 0.15 | 0.15 | — | 0.07 | 0.07 | 0.07 | — | — | 0.3 |
| | | Pitch number | 2.0 | 2.0 | — | 2.5 | 5.0 | 7.0 | — | — | 2.5 |
| Evaluation | | | AA | A | B | AA | B | B | C | C | D |

As shown in Table 1, in the reflection film of the invention, the generation of side lobes was suppressed. Among these, by comparing Examples 2 and 3, it was confirmed that the effect was more excellent, in a case where the second cholesteric liquid crystalline layers were disposed on both surfaces of the first cholesteric liquid crystalline layer.

In addition, by comparing Examples 1 and 2, it was confirmed that the effect was more excellent, in a case where each birefringence of two or more second cholesteric liquid crystalline layers decreases along a direction separated from the first cholesteric liquid crystalline layer.

Furthermore, by comparing Examples 4 to 6, it was confirmed that the effect was more excellent, in a case where the helical pitch number of the second cholesteric liquid crystalline layer is ¼ or less of the helical pitch number of the first cholesteric liquid crystalline layer. Meanwhile, in Comparative Examples 1 and 2 in which only the first cholesteric liquid crystalline layer was provided, and in Comparative Example 3 in which the relationship of the Δn of the liquid crystal compound was not satisfied, the desired effect was not obtained.

EXPLANATION OF REFERENCES 10a, 10b, 10c: reflection film
12: first cholesteric liquid crystalline layer
14a, 14b, 14c, 14d: second cholesteric liquid crystalline layer

What is claimed is:

1. A reflection film, comprising:
a first cholesteric liquid crystalline layer which is formed of a composition including a first liquid crystal compound; and
a second cholesteric liquid crystalline layer which is disposed at least on one surface of the first cholesteric liquid crystalline layer and formed of a composition including a second liquid crystal compound,
wherein a helical pitch length of the first cholesteric liquid crystalline layer is constant,
a birefringence $\Delta n_2$ of the second liquid crystal compound is smaller than a birefringence $\Delta n_1$ of the first liquid crystal compound, and
a helical pitch number of the second cholesteric liquid crystalline layer is a half or less of a helical pitch number of the first cholesteric liquid crystalline layer.

2. The reflection film according to claim 1,
wherein the second cholesteric liquid crystalline layer is disposed on both surfaces of the first cholesteric liquid crystalline layer.

3. The reflection film according to claim 2,
wherein two or more second cholesteric liquid crystalline layers are disposed at least on one surface of the first cholesteric liquid crystalline layer.

4. The reflection film according to claim 2,
wherein the helical pitch number of the second cholesteric liquid crystalline layer is ¼ or less of the helical pitch number of the first cholesteric liquid crystalline layer.

5. The reflection film according to claim 2,
wherein a percentage of the birefringence $\Delta n_2$ of the second liquid crystal compound with respect to the birefringence $\Delta n_1$ of the first liquid crystal compound is 10% to 90%.

6. The reflection film according to claim 1,
wherein two or more second cholesteric liquid crystalline layers are disposed at least on one surface of the first cholesteric liquid crystalline layer.

7. The reflection film according to claim 6,
wherein each birefringence of the two or more second cholesteric liquid crystalline layers decreases along a direction separated from the first cholesteric liquid crystalline layer.

8. The reflection film according to claim 7,
wherein the helical pitch number of the second cholesteric liquid crystalline layer is ¼ or less of the helical pitch number of the first cholesteric liquid crystalline layer.

9. The reflection film according to claim 7,
wherein a percentage of the birefringence $\Delta n_2$ of the second liquid crystal compound with respect to the birefringence $\Delta n_1$ of the first liquid crystal compound is 10% to 90%.

10. The reflection film according to claim 6,
wherein the helical pitch number of the second cholesteric liquid crystalline layer is ¼ or less of the helical pitch number of the first cholesteric liquid crystalline layer.

11. The reflection film according to claim 6,
wherein a percentage of the birefringence $\Delta n_2$ of the second liquid crystal compound with respect to the birefringence $\Delta n_1$ of the first liquid crystal compound is 10% to 90%.

12. The reflection film according to claim 1,
wherein the helical pitch number of the second cholesteric liquid crystalline layer is ¼ or less of the helical pitch number of the first cholesteric liquid crystalline layer.

13. The reflection film according to claim 1,
wherein a percentage of the birefringence $\Delta n_2$ of the second liquid crystal compound with respect to the birefringence $\Delta n_1$ of the first liquid crystal compound is 10% to 90%.

14. The reflection film according to claim 1,
wherein both of a reflection center wavelength of the first cholesteric liquid crystalline layer and a reflection center wavelength of the second cholesteric liquid crystalline layer are positioned in a visible light region.

15. The reflection film according to claim 1,
wherein an absolute value of a difference between a reflection center wavelength of the first cholesteric liquid crystalline layer and a reflection center wavelength of the second cholesteric liquid crystalline layer is equal to or less than 50 nm.

16. The reflection film according to claim 1,
wherein the helical pitch number of the first cholesteric liquid crystalline layer is equal to or more than 10.

17. The reflection film according to claim 1,
wherein the first liquid crystal compound and the second liquid crystal compound are rod-like liquid crystal compounds.

18. A transparent screen, comprising:
the reflection film according to claim 1.

19. A color filter, comprising:
the reflection film according to claim 1.

20. A decorative film, comprising:
the reflection film according to claim 1.

* * * * *